United States Patent
Joshi et al.

(10) Patent No.: US 12,368,652 B2
(45) Date of Patent: Jul. 22, 2025

(54) DISTRIBUTED ORACLE AGREEMENT SYSTEM AND METHOD

(71) Applicant: Unity Chain, Inc., Miami, FL (US)

(72) Inventors: Saurabh Bhanuprasad Joshi, Hyderabad (IN); Aniket Kate, West Lafayette, IN (US); Joshua Tobkin, Perham, MN (US); Yin Yang, Hong Kong (HK)

(73) Assignee: Unity Chain, Inc., Miami, FL (US)

( * ) Notice: Subject to any disclaimer, the term of this patent is extended or adjusted under 35 U.S.C. 154(b) by 0 days.

(21) Appl. No.: 18/732,201

(22) Filed: Jun. 3, 2024

(65) Prior Publication Data

US 2024/0323100 A1    Sep. 26, 2024

Related U.S. Application Data (63) Continuation of application No. PCT/US2023/036923, filed on Nov. 7, 2023.

(60) Provisional application No. 63/423,631, filed on Nov. 8, 2022.

(51) Int. Cl.
*H04L 41/00* (2022.01)

(52) U.S. Cl.
CPC .................................. *H04L 41/30* (2013.01)

(58) Field of Classification Search
CPC ..................................................... H04L 41/30
USPC ........................................................ 370/254
See application file for complete search history.

(56) References Cited

U.S. PATENT DOCUMENTS

| | | | |
|---|---|---|---|
| 10,073,906 B2 * | 9/2018 | Lu | G06F 16/285 |
| 10,242,087 B2 * | 3/2019 | Soceanu | G06F 16/285 |
| 10,416,958 B2 * | 9/2019 | Singh | G06F 16/248 |
| 10,789,507 B2 * | 9/2020 | Saha | G06F 18/2433 |
| 11,088,568 B2 * | 8/2021 | Huberman | H02J 13/00002 |
| 11,392,621 B1 * | 7/2022 | Jaffrey | G06F 16/2246 |
| 11,483,338 B2 * | 10/2022 | Jimenez-Delgado | H04L 9/3239 |
| 11,522,758 B1 * | 12/2022 | Mutalikdesai | G06N 20/20 |

(Continued)

FOREIGN PATENT DOCUMENTS

| | | | | |
|---|---|---|---|---|
| GB | 2604093 A | * | 8/2022 | G06F 17/18 |
| WO | WO-2017132428 A1 | * | 8/2017 | G06N 20/00 |
| WO | WO-2022191959 A1 | * | 9/2022 | G06F 21/445 |

OTHER PUBLICATIONS

PCT Search Report and Written Opinion (PCT/US23/36923), mailed Mar. 1, 2024 (8 pages).

*Primary Examiner* — Melvin H Pollack
(74) *Attorney, Agent, or Firm* — HEA Law PLLC; Darrin A. Auito (57) ABSTRACT

A distributed oracle agreement system and method thereof includes obtaining, by a first oracle node and a second oracle node of a consensus network, a first set and second set of data points from a data source that is external to the consensus network having a plurality of nodes. The method further includes computing a first median of the first set of data points and a second median of the second set of data points. The method includes forming, by an aggregator node, a cluster of data points from the sets of data points with the cluster contains data points within a predetermined distance. The method includes proposing the cluster to the plurality of nodes such that a vote on the cluster is performed. The method includes generating a quorum certificate message in response to the vote. The method includes committing the cluster to a block of the consensus network.

20 Claims, 7 Drawing Sheets

(56) References Cited

U.S. PATENT DOCUMENTS

| | | | | |
|---|---|---|---|---|
| 11,621,902 | B2* | 4/2023 | Simanavicius | H04L 43/0882 370/252 |
| 11,626,993 | B2* | 4/2023 | Zamani | H04L 41/0893 713/168 |
| 11,630,855 | B2* | 4/2023 | Allen | G06F 18/2178 707/740 |
| 11,809,915 | B1* | 11/2023 | Simpson | H04L 41/147 |
| 11,847,488 | B2* | 12/2023 | Zheng | G06F 9/5072 |
| 11,875,400 | B2* | 1/2024 | Padmanabhan | G06F 16/27 |
| 11,887,619 | B2* | 1/2024 | Yang | H04N 21/4668 |
| 11,941,588 | B2* | 3/2024 | Goeringer | H04L 63/0428 |
| 11,962,402 | B2* | 4/2024 | Hoptroff | H04W 12/63 |
| 11,966,501 | B2* | 4/2024 | Ramanan | G06F 16/27 |
| 11,966,818 | B2* | 4/2024 | Manamohan | G06F 11/1658 |
| 11,995,525 | B2* | 5/2024 | Gidney | G06N 3/047 |
| 12,002,045 | B2* | 6/2024 | Ronnow | G06Q 20/382 |
| 12,010,236 | B2* | 6/2024 | Varilly | H04L 63/0435 |
| 12,020,246 | B2* | 6/2024 | Dey | G06Q 20/108 |
| 12,032,556 | B2* | 7/2024 | Michaelis | G06F 16/254 |
| 12,034,299 | B1* | 7/2024 | Caruso | H02J 3/38 |
| 12,056,708 | B2* | 8/2024 | Kim | H04L 9/50 |
| 12,056,766 | B2* | 8/2024 | Ingargiola | G06F 16/2379 |
| 2019/0394047 | A1 | 12/2019 | Karame et al. | |
| 2020/0089791 | A1* | 3/2020 | Raman | H04L 9/3239 |
| 2022/0147774 | A1 | 5/2022 | Bölderl-Ermel et al. | |
| 2022/0278854 | A1 | 9/2022 | Tobkin et al. | |
| 2022/0351288 | A1* | 11/2022 | Britz | G06Q 20/3672 |
| 2022/0368621 | A1* | 11/2022 | Simanavicius | H04L 45/121 |
| 2023/0185965 | A1* | 6/2023 | Li | G06F 21/6254 726/26 |
| 2023/0216755 | A1* | 7/2023 | Bergsten | H04L 43/02 709/224 |
| 2023/0315891 | A1* | 10/2023 | Liu | G06F 21/602 726/26 |
| 2023/0318857 | A1* | 10/2023 | Nazarov | H04L 9/50 713/166 |
| 2023/0319141 | A1* | 10/2023 | Doshi | H04L 67/12 709/226 |
| 2024/0015023 | A1* | 1/2024 | Stock | H04L 9/0819 |
| 2024/0020944 | A1* | 1/2024 | Krishnakumar | G06V 10/72 |
| 2024/0045851 | A1* | 2/2024 | Li | H04L 9/3297 |
| 2024/0046318 | A1* | 2/2024 | Muriqi | G06Q 20/389 |
| 2024/0064031 | A1* | 2/2024 | Gwilliams | H04L 9/50 |
| 2024/0080191 | A1* | 3/2024 | Vinayagamurthy | H04L 12/1813 |
| 2024/0111024 | A1* | 4/2024 | Lau | G01S 13/9004 |
| 2024/0111785 | A1* | 4/2024 | Oh | H04L 9/50 |
| 2024/0127321 | A1* | 4/2024 | Karri | G06Q 10/0838 |
| 2024/0129113 | A1* | 4/2024 | Lee | H04L 9/50 |
| 2024/0143838 | A1* | 5/2024 | Ardhanari | G16H 30/40 |
| 2024/0171413 | A1* | 5/2024 | Dravneek | H04L 9/3273 |
| 2024/0171559 | A1* | 5/2024 | Chen | H04L 63/08 |
| 2024/0176776 | A1* | 5/2024 | Tsiatsikas | G06F 16/285 |
| 2024/0185191 | A1* | 6/2024 | Bernardi | H04L 9/50 |
| 2024/0223595 | A1* | 7/2024 | Bakshi | H04L 63/0236 |
| 2024/0236075 | A1* | 7/2024 | Breitner | H04L 63/0823 |
| 2024/0259201 | A1* | 8/2024 | Enciso | H04L 9/3213 |
| 2024/0265005 | A1* | 8/2024 | Li | G06F 16/256 |

* cited by examiner

DISTRIBUTED ORACLE AGREEMENT SYSTEM AND METHOD

RELATED APPLICATIONS

This application is a Bypass Continuation of International Patent Application No. PCT/US2023/036923, filed on Nov. 7, 2023 designating the United States of America, the entire disclosure of which is incorporated by reference. Priority is claimed to U.S. Provisional Patent Application Ser. No. 63/423,631, filed on Nov. 8, 2022 under 35 U.S.C. § 119 (e), the entire contents of which is incorporated by reference.

TECHNICAL FIELD

The present disclosure relates to improvements to blockchain applications, namely involving scalability and security.

BACKGROUND

Connecting existing Web 2.0 data sources to a blockchain is crucial for next generation blockchain applications. A distributed oracle network (DON) aims at addressing this issue by allowing blockchain smart contracts to function over inputs via the existing Web 2.0 interfaces from real-world sensors, data, and computations.

Performing this information exchange securely, however, is not trivial. First, there may only be a few data sources available to pick from and some of them may crash (e.g., due to a Denial of Service (DOS) attacks or system failures) or send incorrect information (e.g., due to a system compromise or some economic incentives). Second, as most of the data sources today do not offer data in a signed form, the DON system is susceptible to compromise of (i) some oracle entities/nodes themselves and (ii) both a subset of data sources as well as a subset of oracle network nodes to be compromised simultaneously. Third, an adversary may go after the availability of the system (and at times safety) by appropriately slowing down the protocols.

The present disclosure addresses these issues and describes a novel, robust, scalable distributed solution for solving the "oracle problem." The oracle problem is centered on ensuring that external sources produce accurate data values that can be used in a blockchain environment. In particular, for data sources that have a wide array of data values (e.g., weather, market price of an asset, etc.) External data sources present a challenge because data sources can provide data that is inaccurate, out of date, or have malicious values. Solutions described herein are designed to withstand extreme adversarial settings, while taking into consideration real-world synchrony and input-data distribution observations and introducing (oracle) execution sharding.

SUMMARY

A challenge of integrating oracle networks into consensus is ensuring that the output of the oracle network is a unique value that is representative of the honest data sources for the system. In most instances, data sources do not include signatures on the data being accessed by the oracle network. As such, it is possible for compromised nodes to offer incorrect data. It is necessary then for honest nodes to ensure that dishonest data sources do not corrupt their inputs. Solving this last-mile challenge-response problem involves an oracle node collecting data from enough data sources such that a majority of its collected data points are coming from honest data sources.

It is assumed that communication links between data sources and oracle nodes are asynchronous such that oracle nodes cannot differentiate between a slow and a crashed data source. To address asynchronous communication, it will be necessary for every oracle node to contact enough data sources such that at least 67% of those sources are honest. Based on an analysis of real-world data, links between data sources and oracle nodes are very stable and data sources maintain a certain level of availability. As such, the present disclosure presupposes the links to be bounded-synchronous to reduce the required percentage of honest data-sources to 51%. This data-feed collection protocol is a challenge-response mechanism between a node and a subset of data sources and ensures that the value computed by an oracle node is in the range defined by the minimum and the maximum values reported by honest data sources.

After ensuring that honest oracle nodes have input values that are representative of honest data sources, the honest nodes may still have different outputs from the data-feed collection process that need to be homogenized by a Distributed Oracle Agreement (DORA) process as disclosed herein. DORA shares the same termination and agreement properties as the well-studied Byzantine agreement (BA) problem. However, the crucial validity property for DORA is significantly more generic. BA demands that the output be the same as an honest node's input if all honest nodes have the same input. For DORA, this generalizes to suggest that the output will be a value in a range (convex hull) defined by the minimum and maximum honest input.

For example, except when a data source generates volatile data points, honest data sources emit values that are in close proximity to each other such that they form a cluster within an agreement distance. Importantly, the percentage of the honest nodes required for DORA drops to 51%, which in turn, reduces the number of nodes and makes the system scale well for a large number of data values. The systems and methods of the present disclosure ensure that the DORA protocol with a cluster is safe against such volatile data conditions. A fallback option may be included when the clusters cannot be formed or when the agreement output is not consistent with the history. When a rare fallback is executed, the system returns to the superset of nodes with 67% honest majority and executes the DORA protocol to output a representative value.

In an embodiment, a method of distributed oracle agreement includes obtaining, by a first oracle node of a consensus network, a first set of data points from a data source that is external to the consensus network having a plurality of nodes; obtaining, by a second oracle node of a consensus network, a second set of data points from the data source that is external to the consensus network; computing, by the first oracle node, a first median of the first set of data points; computing, by the second oracle node, a second median of the second set of data points; forming, by an aggregator node, a cluster of data points from the first set of data points and the second set of data points such as from the first median and the second median, wherein the cluster contains data points within a distance; proposing, by the aggregator node, the cluster to the plurality of nodes such that a vote on the cluster is performed by the plurality of nodes; generating, by the aggregator node, a quorum certificate message in response to the vote; and committing, by the aggregator node, the cluster to a block of the consensus network.

In another embodiment, a distributed oracle agreement system includes a consensus network comprising a set of oracle nodes and an aggregator node. The set of oracle nodes includes a first oracle node configured to: obtain a first set of data points from a data source that is external to the consensus network; compute a first median of the first set of data points. The set of oracle nodes includes a second oracle node configured to: obtain, a second set of data points from the data source; compute a second median of the second set of data points. The aggregator node is configured to form a cluster of data points from the first set of data points and the second set of data points, wherein the cluster contains data points within a predetermined distance propose the cluster to the set of oracle nodes such that a vote on the cluster is performed by the set of oracle nodes; generate a quorum certificate message in response to the vote; and commit the cluster to a block of the consensus network.

In another embodiment a method includes obtaining, by a set of oracle nodes, a first set of data points and a second set of data points from a set of data sources that is external to the set of oracle nodes. The method may also include selecting a cluster value from the set of first set of data points or the second set of data points; forming, by the set of oracle nodes, a cluster of data points from the first set of data points and the second set of data points, wherein the cluster of data points are within a predetermined distance of the cluster value; proposing, by a node of the set of oracle nodes, the cluster value to the other nodes of the set of oracle nodes, such that a vote on the cluster is performed by the set of oracle nodes; generating, by the node, a quorum certificate message in response to the vote; and committing, by the node, the cluster to a block of a blockchain.

DETAILED DESCRIPTION

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. Throughout the present specification, like numbers refer to like elements.

Public blockchain networks are revolutionizing modern society by facilitating decentralized, immutable and verifiable data exchange. These networks fundamentally provide decentralized computation and storage by marrying fault-tolerant distributed systems design with cryptography to enable higher transparency and accountability than traditional centralized computer networks. At the heart of these networks are consensus networks that enable state machine replication (SMR). A blockchain network is a form of distributed state machine, which is transitioned from one state to another by applying client-submitted instructions called transactions. SMR protocols ensure that every node in the network maintains a consistent state by facilitating their agreement upon the order in which these transactions should be executed. However, integrating external data sources into a public blockchain environment presents several challenges. To integrate external data sources, oracle networks are used to control the flow of external data into the blockchain environment. The use of oracle networks connects the data but is subject to limits on the tolerance of dishonest data sources. As disclosed herein, the systems and methods of distributed oracle agreement improves the tolerance for dishonest data sources.

A key objective of any oracle network is to receive off-chain information and transfer it to the on-chain environment. To do this, any such service has at least three components: (i) data sources that are off-chain, (ii) a consensus network of nodes, and (iii) a target smart contract. As used herein, "off-chain" means that the data sources are external to the blockchain to which the oracle network is publishing data, which may include other blockchain environments (e.g., an external decentralized exchange). Generally, to maintain fault tolerance capabilities and the decentralized nature of the oracle network, it is necessary to receive data from multiple data sources and have multiple nodes to process the off-chain data. Once the off-chain data is received, the oracle network conducts a voting round to determine which value of the off-chain data to insert into a block of the blockchain. The voting round of the oracle network determines which value represents the honest value from honest data sources connected to the oracle network.

A data source is responsible for providing the correct value of a variable r, which could be the price of a digital asset (centralized or decentralized) (e.g., Bitcoin) in US Dollars, a quantity of items in a supply chain, or any parameter that is desirable to track over a time period. For example, DS denotes a set of data sources and $BDS \subset DS$ denotes a subset of these data sources which could be Byzantine. A data source is Byzantine if: (i) it lies about the value of the variable, or (ii) if it is non-responsive. Otherwise, the data source is considered to be "honest" (e.g., reliably providing accurate values). This disclosure presupposes that $|BDS| \leq f_d$, where $f_d$ is the upper bound on the number of Byzantine data sources. The goal of the set of oracle nodes is to reach a consensus in a distributed fashion about a representative value, denoted as S, of a particular variable $\tau$.

As explained above, this disclosure improves computer functionality by improving the fault tolerance and accuracy of oracle networks. This disclosure is now described more fully with reference to all attached figures, in which some embodiments of this disclosure are shown. This disclosure may, however, be embodied in many different forms and should not be construed as necessarily being limited to various embodiments disclosed herein. Rather, these embodiments are provided so that this disclosure is thorough and complete, and fully conveys various concepts of this disclosure to skilled artisans. Note that like numbers or similar numbering schemes can refer to like or similar elements throughout.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including identified articles, web pages, websites, products and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Figure 1:
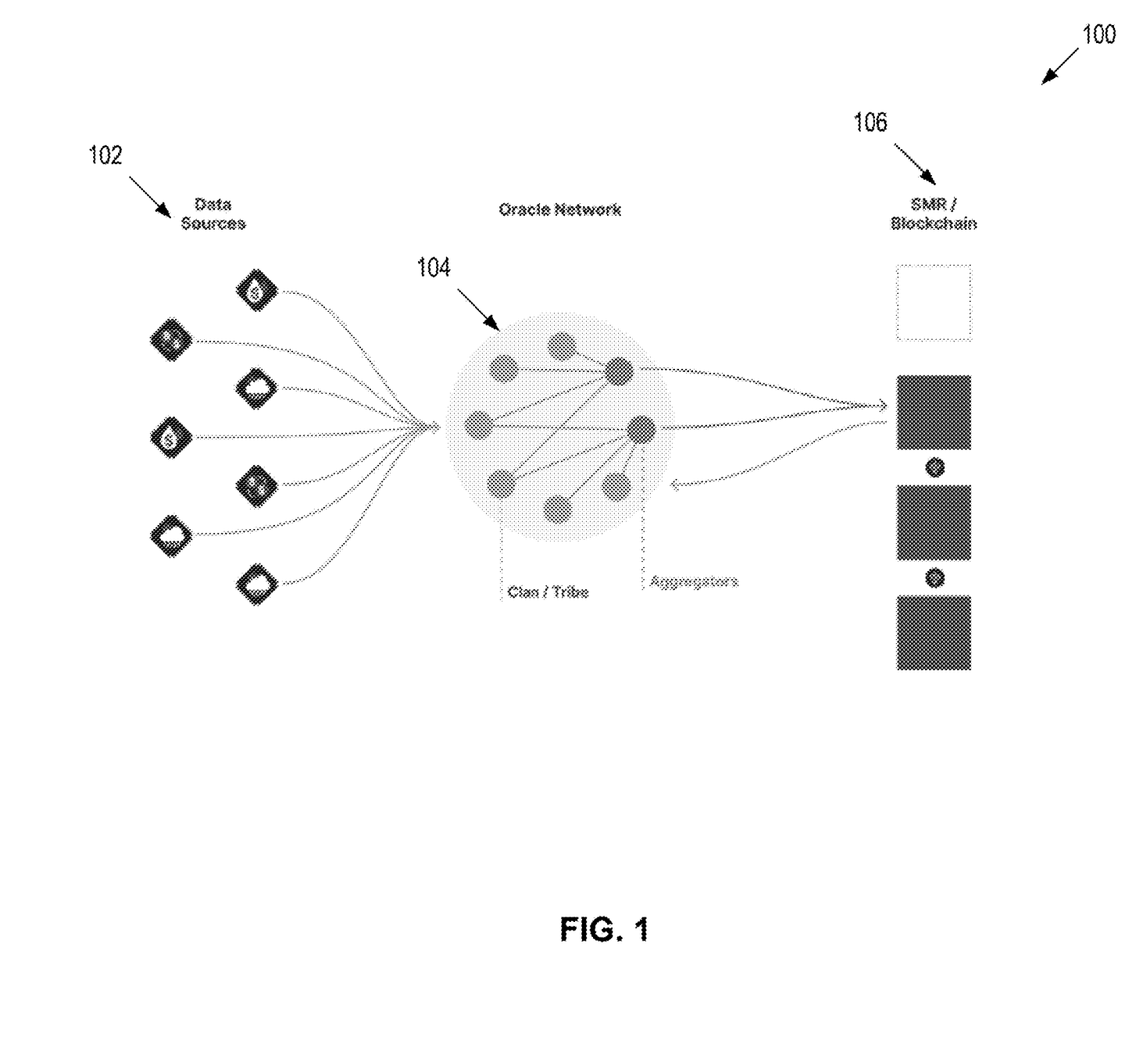
FIG. 1 illustrates an example of a distributed oracle agreement protocol (DORA) according to an embodiment of the present disclosure.

FIG. 1 shows an embodiment of a distributed oracle agreement protocol (DORA) architecture. In particular, the distributed oracle agreement protocol (DORA) architecture 100 includes a set of data sources 102, an oracle network 104, and a blockchain network 106. While the oracle network 104 and the blockchain network 106 are illustrated as separate, this configuration is for explanatory purposes and the oracle network 104 can be included in the blockchain network 106.

The set of data sources 102 may be a set of third-party data sources. For example, the set of data sources 102 may be embodied as a processor, a server, a hardware server, a virtual server, a collection of servers, a cloud computing instance, a server instance, an application server, a database server, a DBMS, a database, a relational database, a NoSQL database, a graph database, an object database, an in-memory database, an API, a REST API, a trained ML model, an ANN, a CNN, an RNN, a processor, an application program, a code, a firmware code, an object code, a source code, a function, a software module, an object, a sensor, a software engine (e.g., a task dedicated software logic that can be started, paused, or stopped), or another suitable data source computing form factor.

The set of data sources 102 may be controlled by a set of entities that are separate and distinct from each other. The set of data sources 102 may be accessible to the oracle network 104 or the blockchain network 106. The set of data sources 102 may store values that correspond to an asset that has at least one parameter that varies over a time period. In some embodiments, the values may include a quantity of the asset in an inventory management system, a price of the asset, a condition of the asset, or other parameters of interest. The values may be numerical, string, or descriptive data (e.g., computed statistical values).

The oracle network 104 may be a decentralized system of multiple interconnected computing devices (e.g., nodes) that collectively provide information to a blockchain network 106 or smart contract. Each node of the oracle network 104 may be an individual computer, server, or virtual computing environment. Each node may participate in the oracle network 104 by receiving data such as a data source of the set of data sources 102 and subsequently verifying the data. The nodes of the oracle network 104 may be configured to receive or listen to an event emitted by the set of data sources 102.

In some embodiments, the nodes of the oracle network 104 may be configured to access the set of data sources 102 directly using an application programming interface (API). The nodes of the oracle network 104 may be connected by pair-wise authenticated point-to-point connections. The point-to-point communication infrastructure may be asynchronous such that an adversary can arbitrarily delay and reorder messages between two honest parties. For example, as typical for all asynchronous systems, for the system's liveness properties, the adversary cannot drop messages between two honest parties. In some embodiments, the consensus network may be initialized with a unique identifier to prevent a replay attack.

In an example, the oracle network 104 includes multiple nodes that each obtain different data values from the set of data sources 102 and agree on a single output to the blockchain network 106. Because some nodes of the oracle network 104 may be dishonest ("a Byzantine node"), the oracle network 104 has at least 2f+1 nodes, where f is an upper-bound on the number of nodes that can be Byzantine. These oracle nodes run a Byzantine agreement protocol in order to agree on a subset of f+1 values.

As further illustrated by FIG. 1, the oracle network may have at least one node that is assigned to function as an aggregator node. The aggregator node(s) receive a proposed set of data values from each node in the oracle network 104. The aggregator nodes attempt to form a cluster of data from the set of data values received from the other nodes in the oracle network. Additional details of the aggregator nodes are described with reference to at least FIG. 2. The aggregator nodes output a value that receives a majority of votes to the blockchain network 106.

The blockchain network 106 may be a decentralized system of multiple interconnected computing devices (e.g., blockchain nodes) that collectively validate and store information using a smart contract. A smart contract may be a program or executable code stored on a blockchain. The smart contract performs computing operations when predetermined conditions are met. Smart contracts may be used to automate the execution of an agreement so that all participants can be immediately certain of the outcome, without any intermediary's involvement or time loss.

Each node of the blockchain network 106 may be an individual computer, server, or virtual computing environment. Each node may participate in the blockchain network 106 by receiving data such as from an aggregator node of the oracle network 104. The nodes of the blockchain network 106 may validate the data received and insert the data into a block of the blockchain if a consensus is satisfied. The blockchain network 106 ensures that the values committed on-chain have a particular order that indicates the values in a time sequence. Further, the blockchain network 106 ensures that any other computing terminal accessing the state of the blockchain receives the same order.

Figure 2:
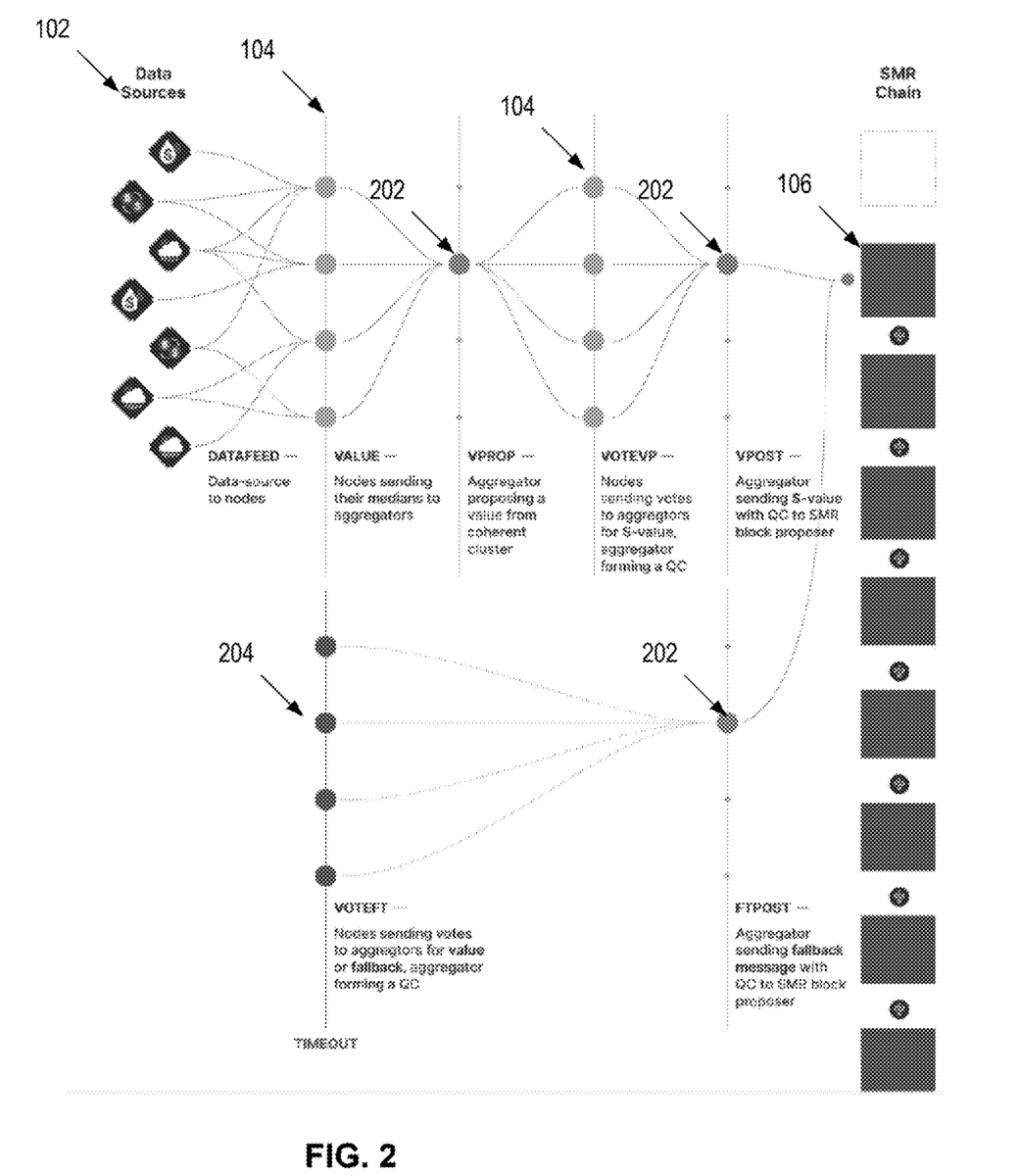
FIG. 2 illustrates an example of a process for DORA according to an embodiment of the present disclosure.

FIG. 2 illustrates an example of a process for DORA according to an embodiment of the present disclosure. In particular, FIG. 2 illustrates the set of data sources 102, the oracle network 104, aggregator nodes 202, and the blockchain network 106. As described above, the set of data sources 102 provides values to nodes of the oracle network 104. In some embodiments. the nodes of the oracle network 104 listen to $2f_d+1$ data sources of set of data sources 102, since $f_d$ data sources can turn Byzantine and provide inaccurate information. Each node of the oracle network 104 computes the median of the $2f_d+1$ data sources. The median computed by each node of the oracle network 104 is communicated to aggregator nodes 202 of the oracle network 104.

The aggregator node 202 receives the medians (e.g., median data values of the variable) from the nodes of the oracle network 104 and attempts to form a cluster. Each aggregator node 202 attempts to form a cluster by computing a set of data values that are within an agreement distance. The agreement distance may be a pre-defined value that defines the maximum distance between data values that is acceptable for commitment to the blockchain network 106. For example, a first node of the oracle network provides a median of 50 units and a second node of the oracle network provides a median of 55 units. For any agreement distance greater than or equal to 5 units, a cluster can be formed by the aggregator node 202. Using the same example, any agreement distance less than 5 units will result in the aggregator node 202 not forming a cluster. Similarly, the aggregator node 202 may receive multiple medians from the nodes of the oracle network. In this case, the aggregator node 202 will form a cluster when a majority of the medians are within the agreement distance. While the above example uses a numerical distance, it will be understood that the distance can be any distance that is computed in a mathematical domain such as curves, convex hulls, Euclidean space, or other mathematical domain.

For example, the variable o may be used to denote a value of a data point stored in a data source. Let O denote the set of all data points for the data source and $O_{pi}$ to denote the observations made by node $p_i$. H(O) and B(O) denote the set of honest observations and Byzantine observations respectively. Let $Hmin(O_{pi})=minH(O_{pi})$ and $Hmax(O_{pi})=maxH(O_{pi})$ indicate the minimum and maximum values from a given set of honest observations $H(O_{pi})$. Hmin and Hmax to refer to the minimum and the maximum values amongst all honest observations H(O). Two observations $o_1$ and $o_2$ agree with each other if $\|o_1-o_2\|_1 \leq b$. In other words, if the $L_1$ distance between them is at most $b$, where $b$ is a pre-defined parameter known as agreement distance. A set of observations $CC \subseteq O$ is said to form a cluster if $\forall o1, o2 \in CC$: $1\|o_1-O_2\|_1 \leq \sigma$. The terms majority and super majority may be used to denote that some entity has a quantity strictly greater than ½ and ⅔ fraction of the total population respectively. For example, an honest majority within a set of nodes would indicate that more than half of the nodes are honest. An honest super-majority would indicate the fraction of honest nodes to be strictly greater than ⅔ of all the nodes within the set. $S_r$ denotes the value for which the oracle network achieved a consensus for it to be considered as the representative value for a round r. The value $S_{r-1}$ denotes the value emitted by the oracle network in the previous round.

In an embodiment, the nodes of the oracle network 104 process each data source with an equal weight. In some embodiments, different data sources may have different reliability guarantees, data volumes, security guarantees, and best practices. As such, each data source may be assigned a weight based on the reliability guarantees, data volumes, security guarantees, and best practices of each data source. Data sources that are more reliable may be assigned greater weights in comparison to data sources which may be less reliable. For example, the sum of weights for all the data sources may be "1" and weights may be 5%, 10%, 15%, 20%, or any weight between 0% and 100%.

In an example, the oracle network 104 can define a weight function w: DS→N+, which assigns different positive integer weights for each data source. The oracle network 104 defines the weight by evaluating parameters like historical reliability, volume/scale, and security practices followed by the data source. It is important to note that while the oracle network 104 assigns a weight to the data sources, a data source crash or malfunction would affect any function that takes its inputs in proportion to its weight. Therefore, the oracle network 104 must evaluate the total weight of the data sources that may turn Byzantine. To determine the total weight, the oracle network 104 uses $f_d$ as the sum of the weights of the data sources that can turn Byzantine. To accommodate this condition, every node of the oracle network 104 listens to data sources such that their total weight is $2f_d+1$. In this case, whenever a value is received from a data source, the oracle network 104 may store copies in a multi-set observation. The size of the multi-set observation is between $f_d+1$ and $2f_d+1$, the lower bound on the number of observations from honest data sources would still be $f_d+1$ and the number of observations from Byzantine data sources would be upper-bounded by $f_d$. The rest of the protocol for DORA would remain the same as described above.

Upon forming the cluster, the aggregator node 202 proposes a value of the cluster to the nodes of the oracle network. In some embodiments, the aggregator node proposes the arithmetic mean of all values in the cluster (e.g., a mean of the values within the predetermined distance). The nodes of the oracle network 104 respond to the aggregator node 202 with a vote. If a majority of the nodes of the oracle network 104 vote to validate the value of the cluster, the aggregator node 202 sends the value to the blockchain network 106. For instance, the aggregator node 202 sends the value to a node of the blockchain network 106 to propose the value for inclusion in a block of the blockchain. A signed message m from a node is denoted by $m(\cdot)_i$. A threshold signature setup may be used by the aggregator node 202 to send messages to the blockchain network 106.

Upon failing to form a cluster (for reasons described above), the aggregator node 202 may receive fallback votes 204 from multiple nodes of the oracle network 104. If any aggregator node receives enough votes to satisfy a fallback quorum, the aggregator node 202 sends a fallback proposal with a quorum certificate to the blockchain network. The fallback proposal may be generated by receiving votes from 3f+1 nodes with the aggregators waiting to receive data values from 2f+1 nodes. While generating the fallback proposal, the oracle network computes median values from the data values from 2f+1 nodes. In some embodiments, the oracle network 104 may process multiple data values (e.g., a set of values) from the data sources simultaneously. To process multiple data values, an additional step to detect anomalous data source values can be performed. For example, there may be relationships that exist amongst different variables that are received from the data sources. For example, let variables $\tau_1$, $\tau_2$, and $\tau_3$ denote values of the ratios BTC/USD, ETH/USD, and BTC/ETH, respectively. The oracle network 104 may have a predetermined relationship that $\tau_1=\tau_2*\tau_3$ among these variables. In an ideal relationship, $\tau1-\tau2*\tau3=0$. In practice, due to variation in observation time (e.g., receiving the data value from the data source) and information propagation across different data sources $|\tau1-\tau2*\tau3|$ may be greater than zero. However, it may be expected that $|\tau1-\tau2\tau3|\leq d_c$ where $d_c$ is the correlation distance denoting a reasonably small deviation that may exist under normal circumstances. The oracle network 104 may use the correlation between variables may to detect anomalous behaviors in the variables. For example, let $f(\tau_1, \tau_2, \ldots, \tau_k): (R^+\cup\{0\})^k \to R^+\cup\{0\}$ denote a function that takes values (e.g., non-negative values) of variables (e.g., a commodity price) and computes the invariant that exists amongst them. For an ideal set of values, the invariant value is "0".

In practice, the oracle network 104 may assign a predefined correlation distance de for each such k-tuple of values (e.g., commodity prices). The oracle network 104 may detect an anomaly whenever the invariant is greater than the predefined correlation distance, such as $f(\tau_1, \tau_2, \ldots, \tau_k)>d_c$. The oracle network 104 may also perform forensic analysis using the invariant. For example, as described above, the oracle network 104 detects an anomaly if $f(\tau_1, \tau_2, \ldots, \tau_k)>d_c$. If an anomaly is detected, then at least some values from data sources (e.g., variables) are exhibiting anomalous activity.

In an example with data sources providing data about multiple variables r, the oracle network 104 may compute multiple invariants to detect whether a particular data-source is outputting anomalous values. For an i-th data-source, the oracle network 104 can compute $f(\tau_1, \tau_2, \ldots, \tau_k)=c_i$, where $c_i$ is the invariant deviation. To detect anomalous activity, the oracle network 104 compares $c_i>\mu_f+\beta_f\sigma_f$, where $\mu_f$ is arithmetic mean of values of f above for all the data sources and $\sigma_f$ is the standard deviation. $\tau_f$ is a tolerance parameter (e.g., a constant parameter) that is configurable to the configuration of oracle network 104 and data sources 102. If $c_i>\mu f+\beta_f\sigma_f$, the data sources is determined to be anomalous. When the oracle network 104 performs DORA for values of multiple variables r, similar multivariate analyses may be used to detect if one or more nodes are behaving anomalously.

In order to use vectors, the DORA process presupposes that all dimensions of each vector are independent of the other dimensions. Let $V_i=(v_{i1}, \ldots, v_{in})$ represent an n-dimensional vector provided by an i-th data-source. The oracle node receives such vectors from at least $2f_d+1$ data sources and computes a median vector by computing component-wise medians of the input vectors. For example, if a node receives vectors $(V_1, \ldots, V_m)$ from m different data-sources, then the median vector is computed as follows:

$$\text{median}\,(V_1, \ldots, V_m) = (\text{median}\,(v_{11}, v_{21}, \ldots, v_{m1}), \ldots, \text{median}\,(v_{1n}, v_{2n}, \ldots, v_{mn})).$$

The oracle node then sends the median vector to the aggregator node as described above. Similar to as described above, the data-sources may be weighted. To apply a weight to the vector, the oracle node computes the median by computing component-wise weighted median.

To form a cluster using vectors, the agreement distance is denoted as d. Two vectors $V_1$ and $V_2$ agree with each other if $\|V_1-V_2\|_2 \leq d$. As briefly described above, the distance is L2-norm for distance for the vector configuration.

$$\|V_1 - V_2\|_2 = \sqrt{(v_{11}-v_{21})^2 + (v_{12}-v_{22})^2 + \ldots + (v_{1n}-v_{2n})^2}$$

A set of vectors $\{V_1, \ldots, V_{f_c+1}\}$ forms a cluster if all the vectors mutually agree with each vector in the set as defined above (e.g., within the agreement distance). In another example, Let there be m data-sources. Let d' be a depth of an orderbook of transactions. Let $(p_{i1}, v_{i1}), \ldots, (p_{id'}, v_{id'})$ denote the orderbook given by i-th data source. The oracle network presupposes that any sell transaction executing at price p, will also execute at any price p'>p. Similarly, any purchase transaction executing at price p, will also execute at any price p'<p. Using these presuppositions, the oracle network 104 can compute a cumulative pv-distribution for an available liquidity of the commodity of the orderbook. The oracle network can compute a cumulative distribution separately for purchase transactions and sell transactions. The cumulative distribution ($p_{i1}$, $v_{i1}$) denotes a cumulative volume $v_{i1}$ of the commodity available for purchase/sell at price $p_{i1}$ at i-th source/exchange. All honest sources should exhibit highly correlated pv-distributions. In this example, the oracle network is processing two-dimensional data and therefore, there is a possibility of data manipulation along both the directions. Additionally, the dimensions of the data are not independent of each other because a commodity with greater transaction higher volume can potentially increase a price of the commodity, and similarly a lower price can potentially increase the transaction volume. In the absence of any adversary (i.e., all exchanges executing transactions are honest), the ideal representative value may be represented by $$\frac{\sum_{i=1}^{m}\sum_{j=1}^{d'}p_{ij}v_{ij}}{\sum_{i=1}^{m}\sum_{j=1}^{d'}v_{ij}}.$$

In other words, the ideal representative price may be the mean of the pv-distribution. To output a single price, the oracle network 104 combines the purchase-side and sell-side distribution and computes a volume weighted mean as shown above. If the combined distribution is skewed toward the sell-side, the computed price would tend to be on the higher side, indicating higher overall price at which a trade can potentially happen considering the available liquidity in the market. Analogously, the computed price would be on the lower side if the combined distribution is skewed toward the buy-side, indicating lower overall price at which a trade can happen considering the available liquidity in the market. In an example where not all exchanges are honest, the adversary may add spurious (p', v') values in the orderbook of corrupted sources.

In another example the term "pv-distribution" being cumulative, separately on buyside and sellside, will be implied. For any given pv-distribution, derived from the orderbook of a data source, the oracle network 104 estimates a volume $v_j$ at any arbitrary $p_j$, where $p_1 < p_j < p_d'$. For a continuous domain, a quadratic regression may be computed such that under normal circumstances, the cumulative pv-distribution tends to exhibit quadratic characteristics, therefore, a quadratic regression on the discrete pv-distribution would give the ability to transfer the distribution into a continuous domain. However, a risk of the quadratic regression is that a single abnormal point can affect the quadratic curve in an adverse fashion. The adverse effect increases as the number of points under adversarial control increases.

In another example, a piecewise-linear interpolation for any two ($p_1$, $v_1$) and ($p_2$, $v_2$) may be performed. The Piecewise-linear interpolation uses the equation $\lambda(p_1, v_1) + (1-\lambda)(p_2, v_2)$, where $0 \leq \lambda \leq 1$ provides the oracle network 104 the ability to find the volume $v_j$ at any point $p_j$ between $p_1$ and $p_2$. One advantage of using piecewise linear interpolation is that the adverse effect only starts after the adversarial point in the cumulative distribution and the part of the piecewise-linear distribution before such an adversarial point remains unaffected. Another advantage of piecewise-linear interpolation over quadratic regression is the speed at which it can be computed. In some cases, the intermediate volume found via linear interpolation would likely be lower than the one found via quadratic regression in most cases. After the oracle network 104 has obtained pv-distributions from all the data sources in the continuous domain, the distributions may be sampled at a regular interval at points $p_i = p_1 + (i-1) \delta$, where $\delta$ is the sampling interval, i is from 1 to n, and n is the sample size with $p_1$ being the best ask/bid (depending upon buy/sell side of the curve we look at). In some cases, $\delta < 0$ may be buy-side and $\delta > 0$ may be sell-side. For any given sampling price point $p_j$, the oracle network 104 determines the median of ($v_{1j}$, $v_{2j}$, $v_{mj}$) from pv-distributions computed for every data source from 1 to m as described above. The median pv-distribution would now have following points:

($p_1$, median($v_{11}$, $v_{21}$, ... , $v_{m1}$)), ($p_2$, median($v_{12}$, $v_{22}$, ... , $v_{m2}$)), ... , ($p_n$, median($v_{1n}$, $v_{2n}$, ... , $v_{mn}$)).

After the oracle network 104 obtains the median pv-distribution, the oracle network 104 may compute the mean of the median pv-distribution. If all data sources are honest, the median pv-distribution will have high correlation and any multiplicative vertical shift of the distribution is not going to affect the mean of the distribution. The mean may be computed by $$\frac{\sum_{i=1}^{m}p_{ij}v_{ij}}{\sum_{i=1}^{m}v_{ij}}.$$

In some embodiments, sets of nodes up to and including all oracle node performs the operations mentioned above upon obtaining orderbook data from various data sources. The set of nodes that perform the above operations output the mean price to an aggregator. Using the DORA protocol will account for available liquidity while outputting a price. This approach mitigates effects of adversarial deviation in the price or the volume.

The oracle network 104 can detect high volatility by performing a history consistency check on the output for the round of DORA. For example, let $S_r$ denote the value output for a variable for a round r. The oracle network 104 computes the history consistency check by performing the following check: $S_{r-1} - c_h \sigma_h \leq S_r \leq S_{r-1} + c_h \sigma_h$, with $S_{r-1}$ indicating the S-value of the previous round (e.g., the value for round 4 in a current round 5). For any length/window of history $W_h$, the oracle network 104 computes a standard deviation of all the S-values within this window denoted as $\sigma_h$. The oracle network 104 assigns a parameter $c_h$ to control the interval of acceptable values. The oracle network 104 generates a flag for an S-value that anomalous if the S-value fails the history consistency check. It should be noted that the history consistency check is similar to a Z-score from statistics. A Z-score in statistics is defined as follows:

$$z = \frac{x - \mu}{\sigma}.$$

The Z-score indicates how many standard deviations away from the mean a given observation is. In contrast, to compute the history consistency check described above, the current value (observation) is within $c_h$ standard deviations of last $W_h$ values away from the $S_{r-1}$ value (e.g., the previous round). By using the previous value to check for anomalous current values, the oracle network 104 allows the history consistency check to be more adaptive to recent trends such as sustained higher deviations in previous rounds. This process improves the tolerance of anomalous data and reduces false positives when compared to using the arithmetic mean such as the Z-score.

In some configurations, the oracle network 104 may classify the deviations using the history consistency check above. For example, if the $S_r$ falls within a bound defined by $S_{r-1} \pm c_h \sigma_h$, the oracle network 104 flags the data value as Green as a highly consistent value. If $S_r$ instead falls within $S_{r-1} \pm c_{2h} \sigma_h$, then the oracle network 104 may flag the data value as Yellow as a moderately consistent value. If $S_r$ falls outside of $S_{r-1} \pm c_{2h} \sigma_h$, then the oracle network 104 may flag the data value as Red as inconsistent. In some embodiments, the oracle network 104 may generate an additional message such as a notification or other metadata including the flag color or the consistency value.

Figure 3:
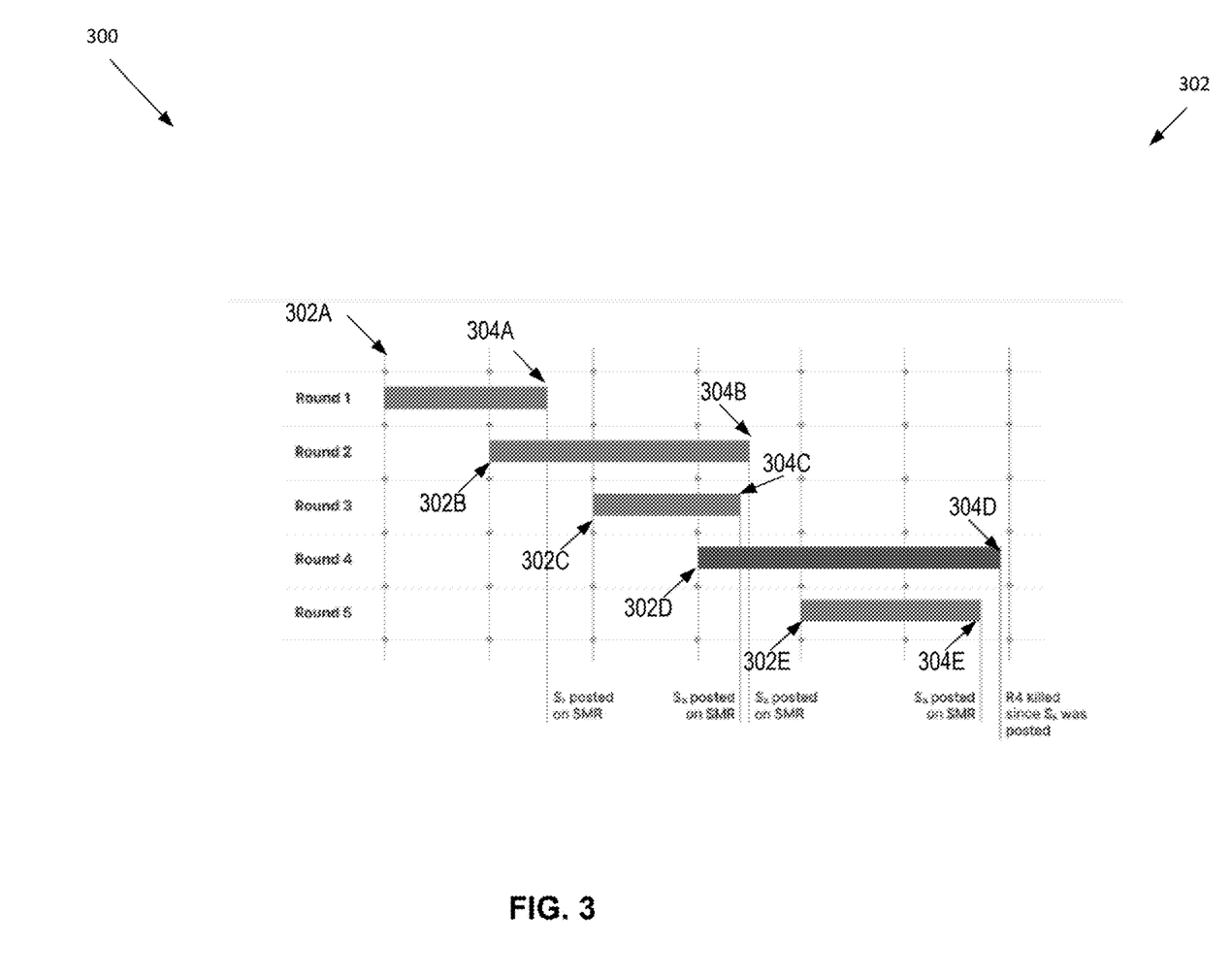
FIG. 3 illustrates an example of a timing diagram for the output of the DORA process to a consensus network according to an embodiment of the present disclosure.

FIG. 3 illustrates an example of a timing diagram for the output of the DORA process to a consensus network according to an embodiment of the present disclosure. As described above, the oracle network receives data values from the set of data sources. The aggregator node of the oracle network forms a cluster and proposes the cluster to the nodes of the oracle network. The nodes of the oracle network vote on the proposed cluster and if a majority (50%+1 node) vote to output the cluster, the aggregator node outputs the value to a block of the blockchain network. As further described, the gathering, cluster, and output process is asynchronous and as such each round may be a different length. FIG. 3 illustrates multiple rounds (i.e., 5 rounds) of receiving values, forming a cluster, and outputting the value to the blockchain. Each round is started at a predetermined time interval such as every 1 second, 2 seconds, or another time interval. Each round has a start point 302A-302E that corresponds to a distributed oracle agreement process being initialized. Each round also has an endpoint 304A-304E. As shown in FIG. 3, the endpoints 304A, 304B, 304C, and 304E visually illustrate the cluster being committed to the blockchain network 106. Endpoint 304D, however, visually illustrates a process being cancelled. In some instances, a distributed oracle agreement process is unable to form a cluster due to dishonest data sources, data sources experiencing failure, a failure of some nodes in the network, or another system issue. This can cause the distributed oracle agreement process executing between 302D and 304D to extend beyond a subsequent process (e.g., the end point 304D occurs after 304E). Because the distributed oracle agreement processes are asynchronous, the subsequent distributed oracle agreement process (i.e., round 5) initializes normally. At end point 304E, the cluster from round 5 is committed to the blockchain network 106. Each node of the oracle network 104 stops performing all operations corresponding to round 4 after the output from round 5 is committed to the blockchain network 106.

Figure 4:
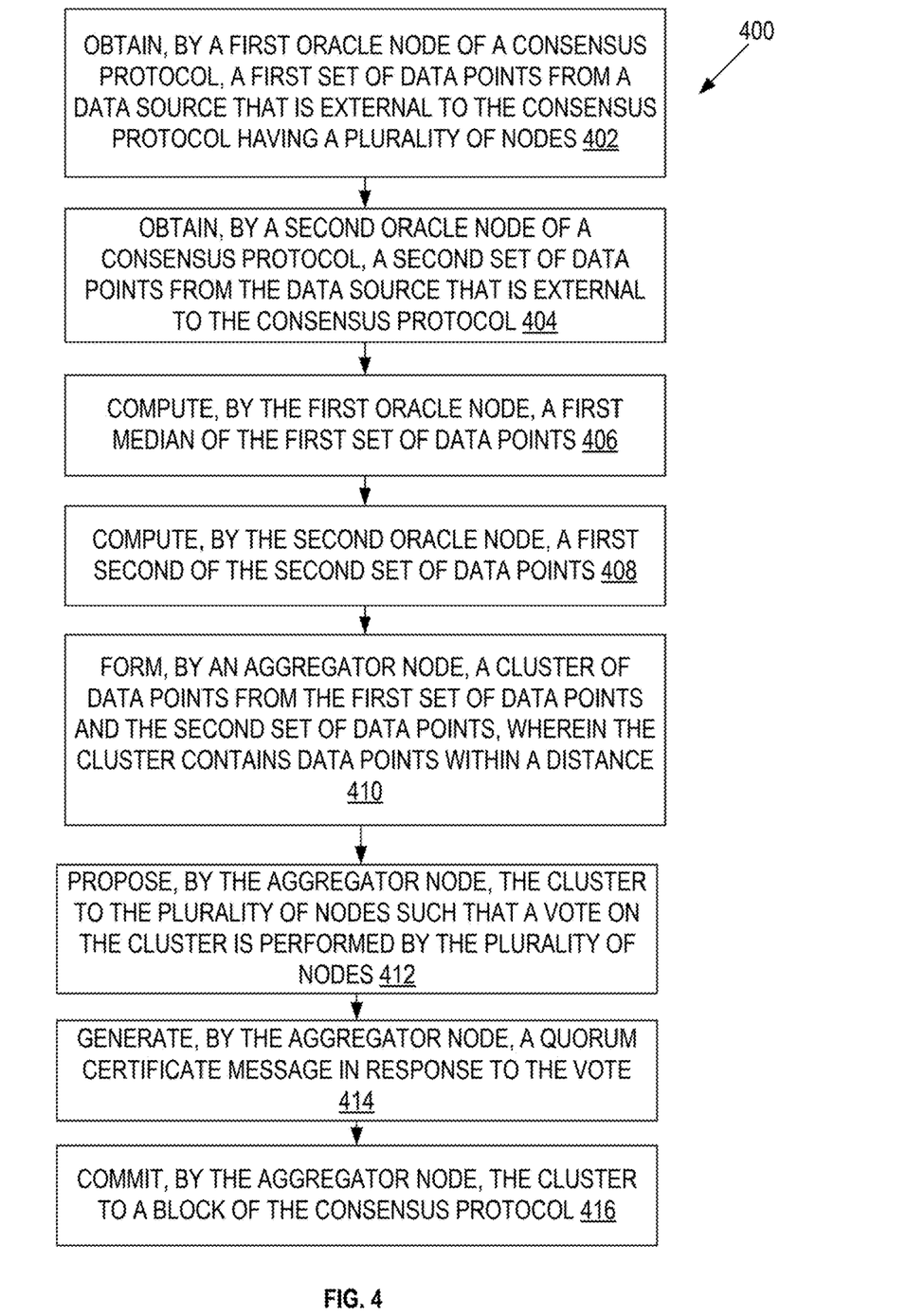
FIG. 4 illustrates a flowchart of a consensus network using DORA according to an embodiment of the present disclosure.

FIG. 4 illustrates a flowchart of a consensus network using DORA according to an embodiment of the present disclosure. For example, process 400 may include a series of computing operations that may be performed by one or more computing devices such as one or more processors of the distributed oracle agreement system as described above.

The one or more processors of the distributed oracle agreement system may be specialized processors configured to execute instruction-set-architecture (ISA) instructions, machine instructions, machine dependent instructions, microcode, firmware instructions, state-setting data, or either source code or object code written in any combination of one or more programming languages, including an object oriented programming language such as PHP, Rust, Python, Ruby, Scala, C++ or the like, and conventional procedural programming languages, such as the "C" programming language or similar programming languages. The instructions may include one or more code segments. The code segment or machine-executable instructions may represent a procedure, a function, a subprogram, a program, a routine, a subroutine, a module, a software package, a class, or any combination of instructions, data structures, or program statements. The code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The instructions may execute entirely on the system gateway, partly on the system gateway, as a stand-alone software package, partly on the system gateway and partly on a remote computer or entirely on the remote computer or server. The remote computer may be connected to the system gateway through any type of network, including a hard-wired connection, a local area network (LAN), a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Each block in the flowchart may represent a module, segment, or portion of instructions, which include one or more executable instructions for implementing the specified logical function(s). In some alternative implementations, the functions noted in the block may occur in a different order than is shown in FIG. 4. For example, two operations shown in succession may be executed substantially concurrently, or the operations may sometimes be executed in the reverse order, depending upon the functionality involved. It will also be noted that each operation of flowchart can be implemented by special purpose hardware-based systems that perform the specified functions or acts or carry out combinations of special purpose hardware and computer instructions. While the following description uses the examples of data source values, an oracle network, and a blockchain network, these are merely illustrative, and any data sources can be processed in a similar manner by an oracle network that is a subset of nodes of a blockchain network and are not intended to be limiting.

At block 402, the process 400 involves obtaining, by a first oracle node of a consensus network, a first set of data points from a data source that is external to the consensus network having a plurality of nodes. As described above, the set of data sources may be accessible to the oracle network. The first oracle network node obtains stored values from the set of data sources with each of the stored values corresponding to a value that varies over time. The first node computes the median of the $2f_d+1$ data sources that are monitored by the first node.

At block 404, the process 400 involves obtaining, by a second oracle node of a consensus network, a second set of data points from the data source that is external to the consensus network. As described above, the set of data sources may be accessible to the oracle network. The second oracle node obtains stored values from the set of data sources with each of the stored values corresponding to a value that varies over time.

At block 406, the process 400 involves computing, by the first oracle node, a first median of the first set of data points. As described above, The first node computes the median of the $2f_d+1$ data sources that are monitored by the first node. While the process 400 describes computing a median, this is not limiting as other computed statistical values may be used.

At block 408, the process 400 involves computing, by the second oracle node, a second median of the second set of data points. As described above, The second node computes the median of the $2f_d+1$ data sources that are monitored by the second node. While the process 400 describes computing a median, this is not limiting as other computed statistical values may be used.

At block 410, the process 400 involves forming, by an aggregator node, a cluster of data points from the first set of data points and the second set of data points, wherein the cluster contains data points within a distance. As described above, The aggregator node 202 attempts to form a cluster by computing a set of data values such as the medians or other statistical aggregate value of the first set of data points and the second set of data points that are within an agreement distance. The agreement distance defines the maximum distance between data values that may be included in the same cluster. For example, a first node of the oracle network provides a median of 100 dollars, a second node of the oracle network provides a median of 102 dollars, and a third node of the oracle network provides a median of 105. For any agreement distance greater than or equal to 5 units, a cluster can be formed with the values (100, 102, 105). Using the same example, any agreement distance greater than 2 units and less than 5 units will result in the aggregator node forming a cluster of (100, 102) while excluding the value 105.

At block 410, the process 400 involves proposing, by the aggregator node, the cluster to the plurality of nodes such that a vote on the cluster is performed by the plurality of nodes. As described above, the aggregator node may propose the cluster or a selected/computed value from the cluster. For example, returning to the previous example with the cluster of (100, 102, 105), the aggregator node may select a value from the cluster or compute an average of the cluster. To propose the value, the aggregator node may communicate the value to the other nodes of the oracle network.

At block 412, the process 400 involves generating, by the aggregator node, a quorum certificate message in response to the vote. As described above, the aggregator receives votes in response to the proposal of the cluster performed at block 410. The aggregator node will count the votes until a majority of votes is returned. After the majority of votes is returned, the aggregator node will prepare a quorum certificate including the value.

At block 414, the process 400 involves committing, by the aggregator node, the cluster to a block of the consensus network. As described above, each node of the blockchain participates in the block chain network by receiving data such as from the aggregator node of the oracle network 104. The nodes of the blockchain network 106 may validate the data received and insert the data into a block of the blockchain if a consensus is satisfied.

Under unusual circumstances, such as when none of the aggregator nodes is able to form a cluster, the distributed oracle agreement system switches to a fallback mechanism. When using the fallback mechanism, the requirement of total nodes increases to 3f+1 with the aggregators wait for 2f+1 nodes to provide a value and compute a median. In this fallback mechanism, the arithmetic mean can not be used anymore since the values introduced by the Byzantine nodes in this set of size 2f+1 could be unbounded. Using the fallback mechanism, the oracle network computes a median from the agreed upon set of size 2f+1. To further scale the fallback mechanism, the fallback process may be distributed by assigning multiple subsets of aggregators from the 3f+1 nodes available to perform oracle functions in the entire consensus network. Multiple subsets can be selected randomly from nodes of the blockchain network 106. By selecting nodes of the blockchain network 106, every subset has an honest simple majority with a high probability (e.g., probability of failure is less than 1 in a Billion). The aggregators may be selected from nodes of the blockchain network 106 to ensure that there is at least one honest aggregator (e.g., no majority required) within the set of aggregators. Multiple aggregators may be used to ensure no liveness issues occur and progress on the protocol is continuously made. In contrast, conventional protocols must elect a new leader/aggregator if the leader/aggregator is Byzantine which delays progress of the protocol. The size and the number of the sets of aggregators are chosen such that each set of aggregators has an honest simple majority. Since under normal circumstances the sets of aggregators only need an honest simple majority, the responsibilities to track multiple variables and bring their values may be assigned to the sets of aggregators.

Figure 5:
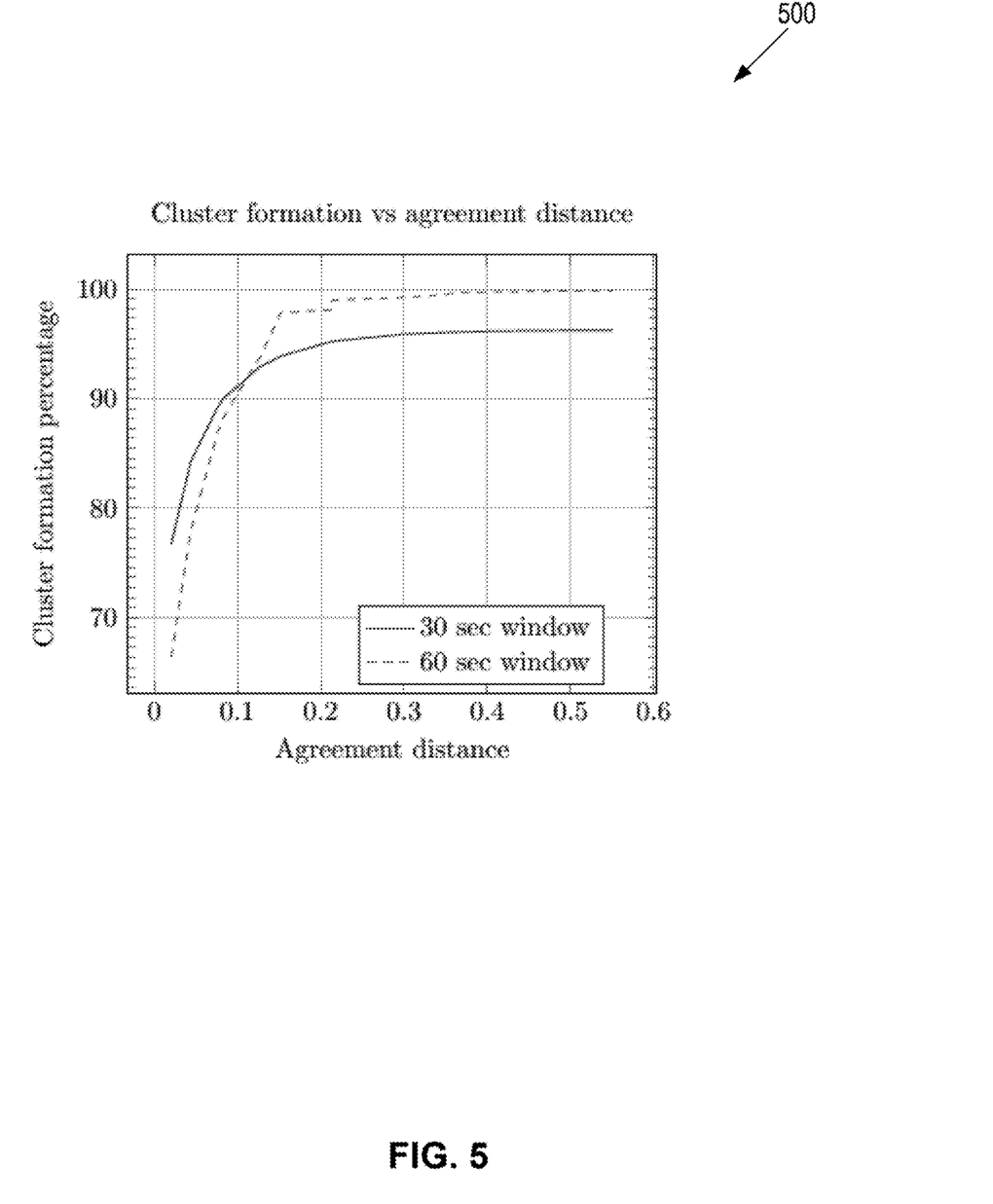
FIG. 5 illustrates a performance chart that shows a correspondence between cluster formation and agreement distance according to an embodiment of the present disclosure.

FIG. 5 illustrates a performance chart 500 that shows a correspondence between cluster formation and agreement distance according to an embodiment of the present disclosure. As the time window during which data can be received by the oracle network 104 increases, it is expected to see more deviation in values among values of various data sources. Therefore, for a given value from the data sources, the aggregator node is able to form coherent clusters more often for 30 second windows as compared to 60 second windows. However, as shown in FIG. 5, there is an increase in data availability from a data source between the 30 to the 60 seconds observation periods. This contributed to the increased percentage of coherent cluster formation for a 60 second window for larger data sets. Note that this choice of has a bearing on both the safety and the performance of the protocol. Smaller values of the predetermined distance (e.g., agreement distance) will result in the protocol having to fall back more often, whereas higher values of from the data source potentially allow higher deviation from the ideal representative value of the mean of honest values. If the value of a data sources increases or decreases significantly, for safety and performance reasons, the predetermined distance should be adjusted up and downwards accordingly.

Figure 6:
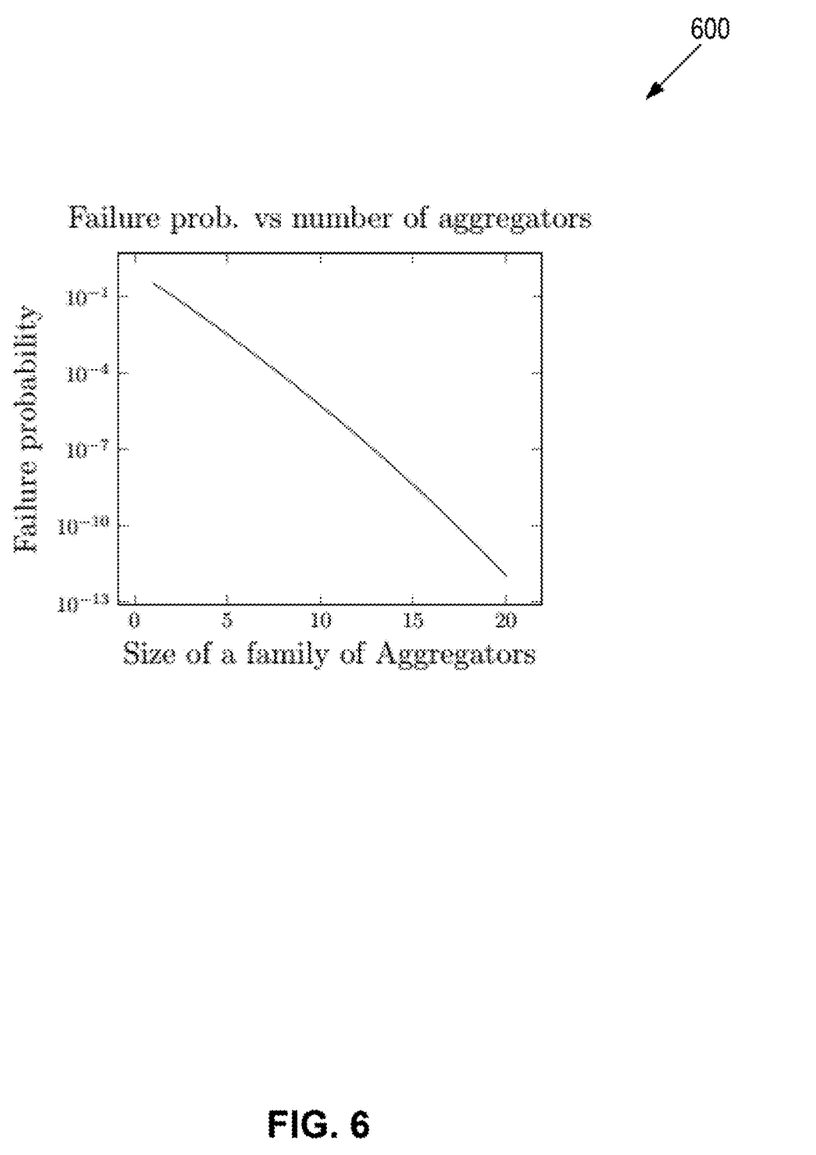
FIG. 6 illustrates a performance chart that shows a correspondence between failure probability and number of aggregator nodes according to an embodiment of the present disclosure.

FIG. 6 illustrates a performance chart 600 that shows a correspondence between failure probability and number of aggregator nodes according to an embodiment of the present disclosure. In particular, FIG. 6 shows a logarithmic plot of how the probability of having a set of all Byzantine aggregators is reduced as the size of the set of aggregators increases. For example, because up to ⅓ of the nodes in network of 100 nodes may be Byzantine, it is evident that as the size of the set of aggregator nodes within the network of 100 nodes increases, the probability of not having a single honest aggregator drops exponentially as illustrated in chart 600.

Figure 7:
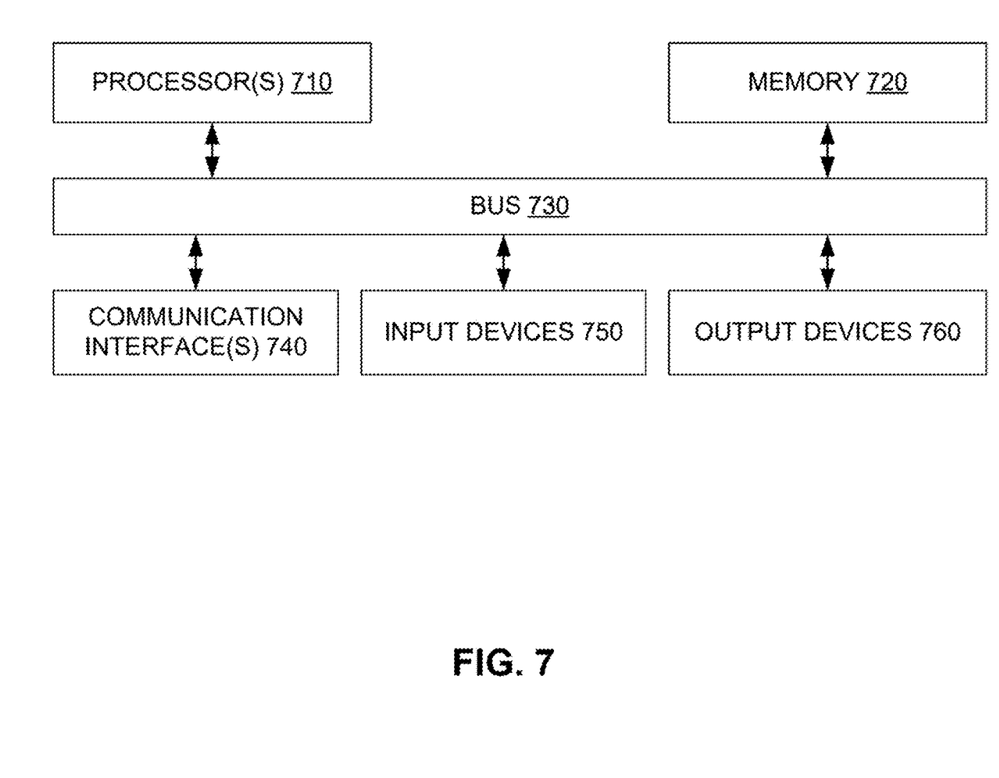
FIG. 7 illustrates an example system of components capable of performing instructions for methods of various embodiments of the present disclosure.

FIG. 7 illustrates an example of a computing device 700 of a computer system capable of implementing distributed oracle agreement. The computing device 700 may include processor(s) 710 (e.g., CPU, GPU, or other processing unit), a memory 720, and communication interface(s) 740 (e.g., a network interface) to communicate with other devices and receive data from those devices, such as external data sources, proposed clusters, votes, quorum certificates, committed values to the blockchain, and other information, as described above. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, joystick, controller, or touchscreen) and output device(s) 760 (e.g., a display, head-up display, AR display, VR display, printer). The aforementioned elements of the computing device 700 may be connected to one another through a bus 730, which represents one or more busses. In some embodiments, the processor(s) 710 of the computing device 700 includes both a CPU and a GPU. In some embodiments, the computing device 700 may be a networked set of computing devices communicatively coupled to a communication network such as a wireless network, wired network, cellular, satellite, or other means of communication between the networked computing devices.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

While various aspects and embodiments have been disclosed, other aspects and embodiments are contemplated. The various aspects and embodiments disclosed are for purposes of illustration and are not intended to be limiting, with the true scope and spirit being indicated by the claims in this application.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting.

What is claimed is:

1. A method comprising:
   obtaining, by a first oracle node of a consensus network, a first set of data points from a data source that is external to the consensus network having a plurality of nodes;
   obtaining, by a second oracle node of the consensus network, a second set of data points from the data source that is external to the consensus network;
   computing, by the first oracle node, a first median of the first set of data points;

computing, by the second oracle node, a second median of the second set of data points;

forming, by an aggregator node, a cluster of data points from the first set of data points and the second set of data points, wherein the cluster contains data points within a predetermined distance;

proposing, by the aggregator node, the cluster to the plurality of nodes such that a vote on the cluster is performed by the plurality of nodes;

generating, by the aggregator node, a quorum certificate message in response to the vote; and committing, by the aggregator node, the cluster to a block of the consensus network.

2. The method of claim 1, wherein the distance defines a maximum distance between any two data points of the cluster.

3. The method of claim 1, wherein the consensus network comprises oracle nodes, aggregator nodes, and blockchain nodes.

4. The method of claim 1, wherein forming, by an aggregator node, a cluster of data points from the first set of data points and the second set of data points, wherein the cluster contains data points within the predetermined distance, comprises:

computing a distance between each point of the first set of data points and each point of the second set of data points;

inserting values into the cluster corresponding to the first set of data points and each point of the second set of data points that are within the predetermined distance; and excluding values from the cluster corresponding to the first set of data points and each point of the second set of data points that exceed the predetermined distance.

5. The method of claim 1, further comprising:

detecting volatility of the first set of data points or the second set of data points, wherein detecting volatility comprises:

comparing a value from the first set of data points or the second set of data points with a previous value that is weighted by a constant parameter and a historical value parameter; and classifying the volatility based on the comparison of the value.

6. The method of claim 1 wherein the cluster of data points from the first set of data points and the second set of data points includes the first median and the second median.

7. The method of claim 1, wherein generating, by the aggregator node, the quorum certificate message in response to the vote comprises:

receiving votes from a set of oracle nodes of the consensus network, wherein each vote is generated by an oracle node of the set of oracle nodes; and creating the quorum certificate in response to receiving a vote from a majority of oracle nodes from the set of oracle nodes.

8. A distributed oracle agreement system comprising:

a consensus network comprising a set of oracle nodes and an aggregator node;

wherein the set of oracle nodes includes a first oracle node configured to:

obtain a first set of data points from a data source that is external to the consensus network;

compute a first median of the first set of data points;

wherein the set of oracle nodes includes a second oracle node configured to:

obtain, a second set of data points from the data source;

compute a second median of the second set of data points;

wherein the aggregator node is configured to:

form a cluster of data points from the first set of data points and the second set of data points, wherein the cluster contains data points within a predetermined distance;

propose the cluster to the set of oracle nodes such that a vote on the cluster is performed by the set of oracle nodes;

generate a quorum certificate message in response to the vote; and commit the cluster to a block of the consensus network.

9. The distributed oracle agreement system of claim 8, wherein the predetermined distance defines a maximum distance between any two data points of the cluster.

10. The distributed oracle agreement system of claim 8, wherein the aggregator node is further configured to:

compute a distance between each point of the first set of data points and each point of the second set of data points;

insert values into the cluster corresponding to the first set of data points and each point of the second set of data points that are within the predetermined distance; and exclude values from the cluster corresponding to the first set of data points and each point of the second set of data points that exceed the predetermined distance.

11. The distributed oracle agreement system of claim 8, wherein the set of oracle nodes is further configured to:

detect volatility of the first set of data points or the second set of data points, wherein detecting volatility comprises:

compare a value from the first set of data points or the second set of data points with a previous value that is weighted by a constant parameter and a historical value parameter; and classify the volatility based on the comparison of the value.

12. The distributed oracle agreement system of claim 8, wherein the cluster of data points from the first set of data points and the second set of data points includes the first median and the second.

13. The distributed oracle agreement system of claim 8, wherein to generate, by the aggregator node, the quorum certificate message in response to the vote comprises:

receiving votes from a set of oracle nodes of the consensus network, wherein each vote is generated by an oracle node of the set of oracle nodes; and creating the quorum certificate in response to receiving a vote from a majority of oracle nodes from the set of oracle nodes.

14. A method comprising:

obtaining, by a set of oracle nodes, a first set of data points and a second set of data points from a set of data sources that is external to the set of oracle nodes;

selecting a cluster value from the set of first set of data points or the second set of data points;

forming, by the set of oracle nodes, a cluster of data points from the first set of data points and the second set of data points, wherein the cluster of data points are within a predetermined distance of the cluster value;

proposing, by a node of the set of oracle nodes, the cluster value to the other nodes of the set of oracle nodes, such that a vote on the cluster is performed by the set of oracle nodes;

generating, by the node, a quorum certificate message in response to the vote; and committing, by the node, the cluster to a block of a blockchain.

15. The method of claim 14, wherein the predetermined distance defines the maximum distance between any two data points of a cluster of data points.

16. The method of claim 14, wherein forming, by the set of oracle nodes, a cluster of data points from the first set of data points and the second set of data points comprises:

computing a distance between each point of the first set of data points and each point of the second set of data points;

inserting values into the cluster corresponding to the first set of data points and each point of the second set of data points that are within the predetermined distance; and excluding values from the cluster corresponding to the first set of data points and each point of the second set of data points that exceed the predetermined distance.

17. The method of claim 14 further comprising:

detecting volatility of the first set of data points or the second set of data points, wherein detecting volatility comprises:

comparing a value from the first set of data points or the second set of data points with a previous value that is weighted by a constant parameter and a historical value parameter; and classifying the volatility based on the comparison of the value.

18. The method of claim 14 wherein the cluster of data points from the first set of data points and the second set of data points includes a first median and a second median.

19. The method of claim 14, wherein the set of oracle nodes and the blockchain are components of a consensus network.

20. The method of claim 14, wherein the first set of data points and the second set of data points are each vectors that include multiple data points, and wherein the predetermined distance is the distance of the vector coordinates from an origin of a vector space.

\* \* \* \* \*